United States Patent
Yokouchi et al.

(10) Patent No.: US 8,909,403 B2
(45) Date of Patent: Dec. 9, 2014

(54) POWERTRAIN, METHOD FOR CONTROLLING POWERTRAIN, AND DEVICE FOR CONTROLLING POWERTRAIN

(75) Inventors: Yoshimitsu Yokouchi, Okazaki (JP); Kenji Miyasaka, Toyota (JP); Tetsuo Hori, Toyota (JP); Hideto Watanabe, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/824,756

(22) PCT Filed: Oct. 7, 2010

(86) PCT No.: PCT/JP2010/067638
§ 371 (c)(1),
(2), (4) Date: Mar. 18, 2013

(87) PCT Pub. No.: WO2012/046324
PCT Pub. Date: Apr. 12, 2012

(65) Prior Publication Data
US 2013/0190962 A1 Jul. 25, 2013

(51) Int. Cl.
*B60W 20/00* (2006.01)
*B60W 10/06* (2006.01)
(Continued)

(52) U.S. Cl.
CPC ............ *B60W 20/00* (2013.01); *F02D 29/02* (2013.01); *Y10S 903/93* (2013.01); *B60W 50/032* (2013.01); *F02D 2200/1015* (2013.01); *B60W 2710/081* (2013.01); *Y02T 10/6239* (2013.01); *Y02T 10/6286* (2013.01); *F02D 2041/227* (2013.01); *B60W 2710/0644* (2013.01); *F02P 11/02* (2013.01); *B60W 50/029* (2013.01); *B60K 6/445* (2013.01); *B60W 2510/244* (2013.01); *F02D 17/04* (2013.01); *B60W 10/08* (2013.01); *F02D 41/123* (2013.01); *B60W 10/06* (2013.01); *Y10S 903/904* (2013.01); *Y10S 903/905* (2013.01); *Y10S 903/906* (2013.01)
USPC ................... 701/22; 180/65.275; 180/65.285; 903/904; 903/905; 903/906; 903/930

(58) Field of Classification Search
CPC ..... B60W 20/00; B60W 10/06; B60W 10/08; Y10S 903/03
USPC ............. 701/22; 180/65.275, 68.285, 65.852; 903/904, 905, 906, 930
See application file for complete search history.

(56) References Cited

U.S. PATENT DOCUMENTS

| 7,412,954 B2 | 8/2008 | Shiino et al. |
| 2003/0173123 A1* | 9/2003 | Nakanowatari ............. 180/65.2 |
| 2010/0286858 A1 | 11/2010 | Otokawa |

FOREIGN PATENT DOCUMENTS

| DE | 10 2008 041 453 A1 | 2/2010 | |
| JP | A-2001-41097 | 2/2001 | |
| JP | A-2003-269233 | 9/2003 | |
| JP | 2004-028280 * | 1/2004 | ............ B60K 17/04 |

(Continued)

*Primary Examiner* — Mary Cheung
*Assistant Examiner* — Brian P Sweeney
(74) *Attorney, Agent, or Firm* — Oliff PLC

(57) ABSTRACT

A powertrain includes: an engine provided with a plurality of cylinders; a first motor generator coupled to an output shaft of the engine; and an ECU for controlling them. When misfire in the engine is detected, the output shaft of the engine is rotated by driving the first motor generator with ignition and supply of fuel to the engine being suspended.

8 Claims, 14 Drawing Sheets

(51) Int. Cl.
  *B60W 10/08*   (2006.01)
  *F02D 29/02*   (2006.01)
  *B60W 50/032*  (2012.01)
  *F02P 11/02*   (2006.01)
  *B60W 50/029*  (2012.01)
  *B60K 6/445*   (2007.10)
  *F02D 17/04*   (2006.01)
  *F02D 41/12*   (2006.01)
  *F02D 41/22*   (2006.01)

(56) References Cited

FOREIGN PATENT DOCUMENTS

| | | |
|---|---|---|
| JP | A-2004-28280   | 1/2004 |
| JP | A-2004-270512  | 9/2004 |
| JP | A-2006-46092   | 2/2006 |
| JP | A-2006-57590   | 3/2006 |
| JP | A-2006-282162  | 10/2006 |
| JP | A-2007-278146  | 10/2007 |
| JP | A-2009-208700  | 9/2009 |

* cited by examiner

F I G. 1
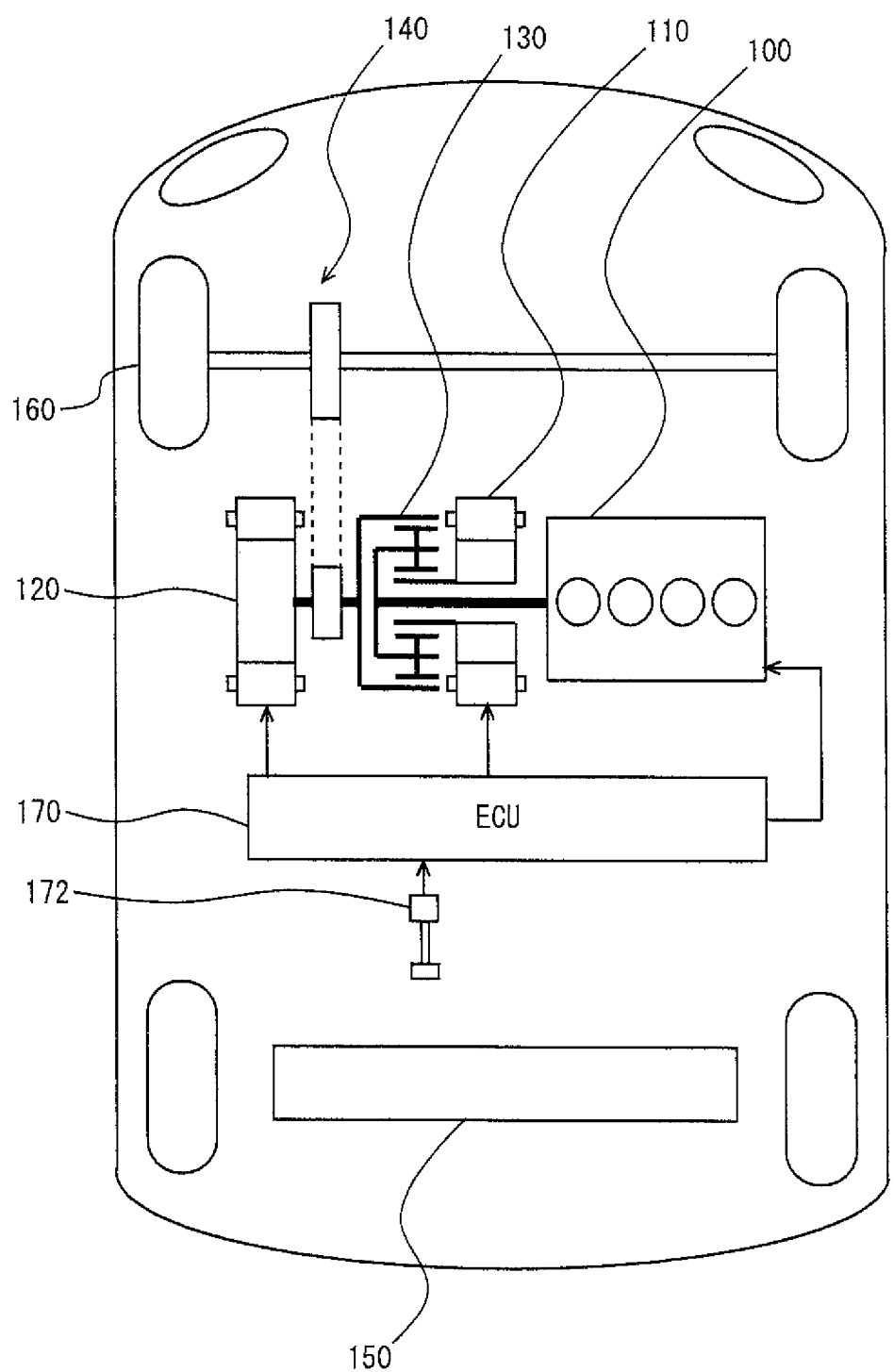

POWERTRAIN, METHOD FOR CONTROLLING POWERTRAIN, AND DEVICE FOR CONTROLLING POWERTRAIN

TECHNICAL FIELD

The present invention relates to a powertrain, a control method for the powertrain, and a control device for the powertrain, in particular, a technique of controlling a powertrain including an internal combustion engine provided with a plurality of cylinders.

BACKGROUND ART

An internal combustion engine provided with a plurality of cylinders has been known. Generally, in each of the cylinders of the internal combustion engine, an intake valve, an exhaust valve, and a piston are provided. Generally, when the piston is moved down with the intake valve opened and the exhaust valve closed, air enters via the intake valve (intake stroke). When the piston is moved up with the intake valve and the exhaust valve closed, the air is compressed (compression stroke). When an air-fuel mixture is ignited using an ignition plug or the like, the air-fuel mixture is combusted and expanded. As a result, the piston is moved down (combustion stroke or expansion stroke). Thereafter, the exhaust valve is opened and the piston is moved up, thereby exhausting exhaust gas (exhaust stroke). In a general four-stroke internal combustion engine, the above-described four strokes are repeated for every 720° in crank angle.

The combustion state in each of the cylinders can be changed depending on a state of the air and the fuel. For example, when temperature is low, when humidity is high, or the like, the combustion state can be deteriorated. When the combustion state is thus deteriorated, misfire can occur. When the misfire occurs in the four-stroke engine, rotational speed (angular speed) of the crankshaft can be greatly fluctuated in the interval of 720° in crank angle. As a result, vibration can be transferred to the vehicle body. Such vibration makes an occupant of the vehicle feel unpleasant. Hence, the misfire needs to be detected for an appropriate countermeasure when the misfire occurs.

Japanese Patent Laying-Open No. 2001-41097 discloses a malfunction diagnosis device for a hybrid vehicle. The malfunction diagnosis device determines whether or not misfire occurs in an engine, based on torque of an engine output shaft or a state of fluctuation of rotational speed. Further, Japanese Patent Laying-Open No. 2001-41097 discloses to suppress the misfire in the engine by increasing an amount of fuel injection to increase fuel pressure, advancing ignition timing, and the like.

CITATION LIST

Patent Literature

PTL 1: Japanese Patent Laying-Open No. 2001-41097

SUMMARY OF INVENTION

Technical Problem

However, the misfire in the engine may not be suppressed immediately with certainty by increasing the amount of fuel injection to increase the fuel pressure and advancing the ignition timing. Accordingly, until the misfire in the engine is suppressed, the vehicle body can be vibrated. Hence, a technique of reducing the vibration more quickly is desired.

The present invention has been made in the foregoing problem. The present invention has its object to immediately reduce vibration resulting from misfire and to suppress misfire.

Solution to Problem

A powertrain in an embodiment includes: an internal combustion engine provided with a plurality of cylinders; an electric motor coupled to an output shaft of the internal combustion engine; and a control unit that suspends ignition and supply of fuel to the internal combustion engine when misfire in the internal combustion engine is detected and rotates the output shaft of the internal combustion engine by driving the electric motor while maintaining the suspension of the ignition and supply of fuel to the internal combustion engine.

A method for controlling an internal combustion engine in another embodiment includes the steps of: detecting misfire in the internal combustion engine; suspending ignition and supply of fuel to the internal combustion engine when the misfire in the internal combustion engine is detected; and rotating an output shaft of the internal combustion engine by driving an electric motor coupled to the output shaft of the internal combustion engine while maintaining the suspension of the ignition and supply of fuel to the internal combustion engine.

A device for controlling an internal combustion engine in still another embodiment includes: means for detecting misfire in the internal combustion engine; and means for suspending ignition and supply of fuel to the internal combustion engine when the misfire in the internal combustion engine is detected and rotating an output shaft of the internal combustion engine by driving an electric motor coupled to the output shaft of the internal combustion engine while maintaining the suspension of the ignition and supply of fuel to the internal combustion engine.

Advantageous Effects of Invention

If misfire is detected, ignition and supply of fuel to the internal combustion engine are suspended. In other words, combustion of air-fuel mixture in all the cylinders is suspended. Accordingly, fluctuation of the rotational speed of the output shaft of the internal combustion engine is made small. In this way, vibration resulting from the misfire is reduced quickly. In this state, the output shaft of the internal combustion engine is rotated by an electric motor. Accordingly, air having caused the misfire is exhausted from the cylinders and new air is supplied to fill the cylinders. Hence, when resuming the ignition and supply of fuel, misfire can be less likely to occur. In this way, the misfire is suppressed.

BRIEF DESCRIPTION OF DRAWINGS

FIG. 1 is a schematic configuration diagram showing a hybrid vehicle.

DESCRIPTION OF EMBODIMENTS

Figure 2:
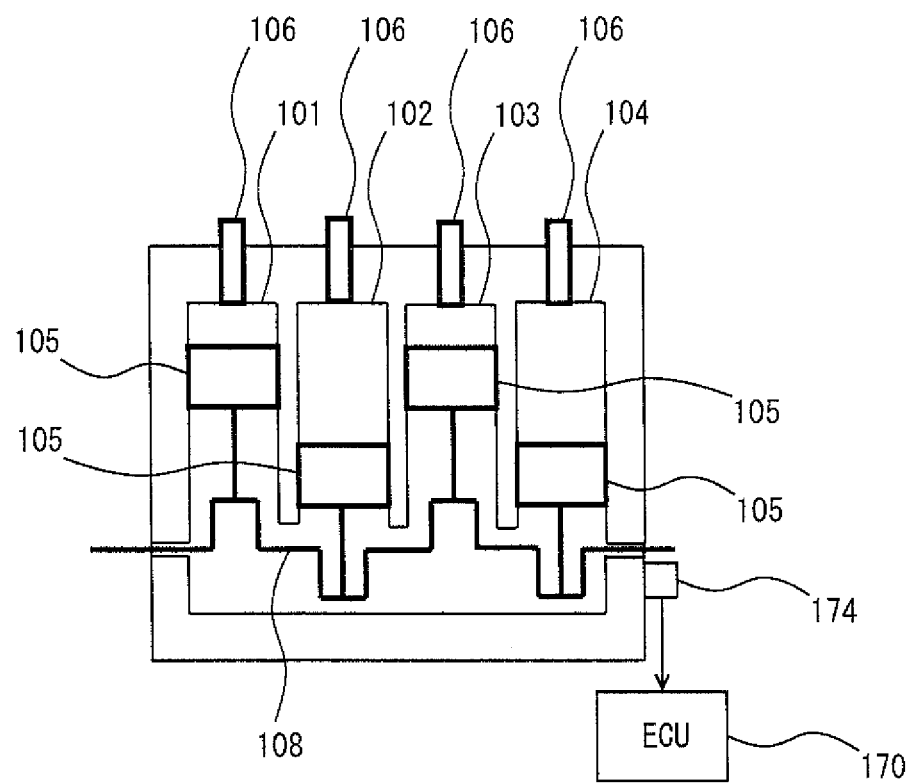
FIG. 2 is a schematic configuration diagram showing an engine.

In the following, an embodiment of the present invention will be described with reference to figures. In the following description, the same parts are denoted with the same reference numerals. Their designations and functions are also the same. Therefore, a detailed description thereof will not be repeated.

Referring to FIG. 1, a hybrid vehicle is equipped with an engine 100, a first motor generator 110, a second motor generator 120, a power split device 130, a speed reducer 140, and a battery 150. It should be noted that a hybrid vehicle that does not have a function of charging from an external power source is described in the following description by way of example. However, a plug-in hybrid vehicle, which has the function of charging from an external power source, may be employed.

Engine 100, first motor generator 110, second motor generator 120, and battery 150 are controlled by an ECU (Electronic Control Unit) 170. ECU 170 may be divided into a plurality of ECUs.

The hybrid vehicle has a powertrain including engine 100, first motor generator 110, second motor generator 120, and ECU 170 for controlling them. The hybrid vehicle runs using a driving force from at least one of engine 100 and second motor generator 120. More specifically, either one or both of engine 100 and second motor generator 120 are automatically selected as a driving source depending on an operation state.

For example, engine 100 and second motor generator 120 are controlled in accordance with a result of a driver's operation on an accelerator pedal 172. An amount of operation on accelerator pedal 172 (accelerator position) is detected by an accelerator position sensor (not shown).

When the accelerator position is small and the vehicle speed is low, the hybrid vehicle runs using only second motor generator 120 as a driving source. In this case, engine 100 is stopped. However, engine 100 is sometimes driven, for example, for power generation.

On the other hand, when the accelerator position is large, when the vehicle speed is high, or when the state of charge (SOC) of battery 150 is small, engine 100 is driven. In this case, the hybrid vehicle runs on only engine 100 or both of engine 100 and second motor generator 120 as a driving source.

Engine 100 is an internal combustion engine. As shown in FIG. 2, in the present embodiment, engine 100 is a four-stroke engine provided with a first cylinder 101, a second cylinder 102, a third cylinder 103, and a fourth cylinder 104. It should be noted that the number of cylinders is not limited to 4 and may be any number such as 5, 6, 8, or 12.

As known well, each of the cylinders in engine 100 is provided with an intake valve (not shown), an exhaust valve (not shown), a piston 105, an ignition plug 106, and an injector (not shown). Each piston 105 is coupled to a crankshaft, which is an output shaft 108, via a connecting rod. Therefore, by rotating the crankshaft, each piston 105 is moved up and down. Fuel is injected by the injector to each of the cylinders.

When piston 105 is moved down with the intake valve opened and the exhaust valve closed, air enters via the intake valve (intake stroke). When piston 105 is moved up with the intake valve and the exhaust valve closed, the air is compressed (compression stroke). When an air-fuel mixture is ignited using ignition plug 106 or the like, the air-fuel mixture is combusted and expanded. As a result, piston 105 is moved down (combustion stroke or expansion stroke). As a result, the crankshaft is rotated. Thereafter, the exhaust valve is opened and piston 105 is moved up, thereby exhausting exhaust gas (exhaust stroke). The cylinders are ignited in a predetermined order. For example, the cylinders are ignited in the order of first cylinder 101, third cylinder 103, fourth cylinder 104, and second cylinder 102. It should be noted that the order of ignition is not limited to this.

In a general four-stroke internal combustion engine, the above-described four strokes are repeated for every 720° in crank angle. Hence, the air-fuel mixture is exploded four times in the interval of 720°. Accordingly, so far as the air-fuel mixture is normally combusted in each of the cylinders, engine 100 generates vibration of approximately 40 Hz when the rotational speed of the crankshaft (engine speed NE) is 1200 rpm.

If misfire occurs in two cylinders not contiguous in the order of ignition, the air-fuel mixture is exploded twice in total in the interval of 720°. In this case, vibration of approximately 20 Hz is generated when engine speed NE is 1200 rpm. In the case where engine speed NE is 600 rpm, vibration of 10 Hz is generated.

If misfire occurs in three cylinders, the air-fuel mixture is exploded once in the interval of 720°. If misfire occurs in only one cylinder, one explosion of the air-fuel mixture does not occur in the interval of 720°. In other words, in the interval of 720°, the rotational speed (angular speed) of the crankshaft is drastically decreased for one time. If misfire occurs only in two cylinders contiguous in the order of ignition, two explosions of the air-fuel mixture occur in total in the interval of 720°, but the rotational speed of the crankshaft is increased only for the earlier 360° or the later 360° of 720°. In these cases, when engine speed NE is 1200 rpm, it is considered that vibration of approximately 10 Hz is generated.

Such vibration can be amplified when a difference between engine speed NE and resonance frequency of the powertrain is small. Hence, when the resonance frequency of the powertrain is for example 10 Hz, the vehicle body can be greatly vibrated due to the misfire in the operating region around 600 rpm or 1200 rpm in the above-described example.

The rotational speed (angular speed) of engine 100 is detected by a rotational speed sensor (crank position sensor) 174, and a signal indicating a result of the detection is sent to ECU 170. As known well, engine speed NE, i.e., rotational speed of output shaft 108 per minute, is determined from rotational speed of engine 100.

Turning back to FIG. 1, engine 100, first motor generator 110, and second motor generator 120 are connected to output shaft (crankshaft) 108 of engine 100 via power split device 130. Motive power generated by engine 100 is split into two paths by power split device 130. One of the paths is a path for driving front wheels 160 via speed reducer 140. The other is a path for driving first motor generator 110 for electric power generation.

First motor generator 110 is a three-phase alternating current rotating electric machine including a U-phase coil, a V-phase coil, and a W-phase coil. First motor generator 110 generates electric power using the motive power of engine 100 that is split by power split device 130. The electric power generated by first motor generator 110 is used depending on the running state of the vehicle and a state of state of charge of battery 150. For example, in the normal running, electric power generated by first motor generator 110 is directly used as electric power for driving second motor generator 120. On the other hand, when the SOC of battery 150 is lower than a predetermined value, electric power generated by first motor generator 110 is converted from alternating current to direct current by an inverter described later. Thereafter, the voltage is adjusted by a converter described later and then stored in battery 150.

When first motor generator 110 acts as a power generator, first motor generator 110 generates negative torque. Here, the negative torque refers to such torque that becomes a load on engine 100. When first motor generator 110 receives power supply and acts as a motor, first motor generator 110 generates positive torque. Here, the positive torque refers to such torque that does not become a load on engine 100, that is, such torque that assists in rotation of engine 100. This is applicable to second motor generator 120.

Second motor generator 120 is a three-phase alternating current rotating electric machine including a U-phase coil, a V-phase coil, and a W-phase coil. Second motor generator 120 is driven using at least one of electric power stored in battery 150 and electric power generated by first motor generator 110.

Driving force of second motor generator 120 is transmitted to front wheels 160 through speed reducer 140. Accordingly, second motor generator 120 assists engine 100 or allows the vehicle to run with the driving force from second motor generator 120. The rear wheels may be driven in place of or in addition to front wheels 160.

At the time of regenerative braking of the hybrid vehicle, second motor generator 120 is driven by front wheels 160 through speed reducer 140, so that second motor generator 120 operates as a power generator. Thus, second motor generator 120 operates as a regenerative brake which converts braking energy into electric power. This electric power generated by second motor generator 120 is stored in battery 150.

Power split device 130 is formed of a planetary gear including a sun gear, pinion gears, a carrier, and a ring gear. The pinion gears are engaged with the sun gear and the ring gear. The carrier supports the pinion gears such that they are rotatable on their own axes. The sun gear is coupled to the rotation shaft of first motor generator 110. The carrier is coupled to the crankshaft of engine 100. The ring gear is coupled to a rotation shaft of second motor generator 120 and speed reducer 140.

Figure 3:
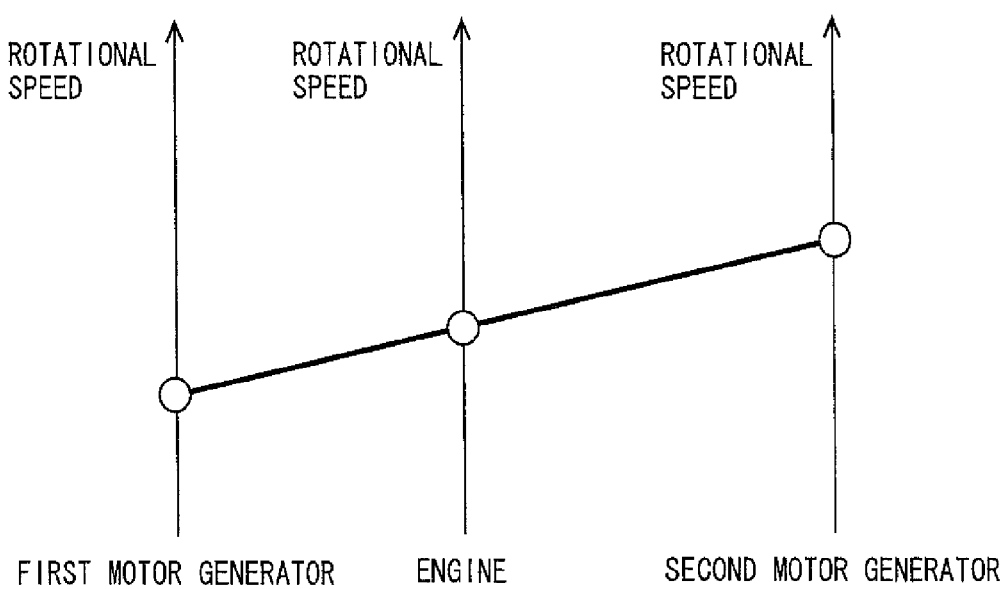
FIG. 3 is a first diagram showing a nomographic chart of a power split device.

Engine 100, first motor generator 110, and second motor generator 120 are coupled to one another via power split device 130 formed of the planetary gear. Accordingly, the rotational speeds of engine 100, first motor generator 110, and second motor generator 120 have a relation represented by a straight line in a nomograph chart as shown in FIG. 3.

Figure 4:
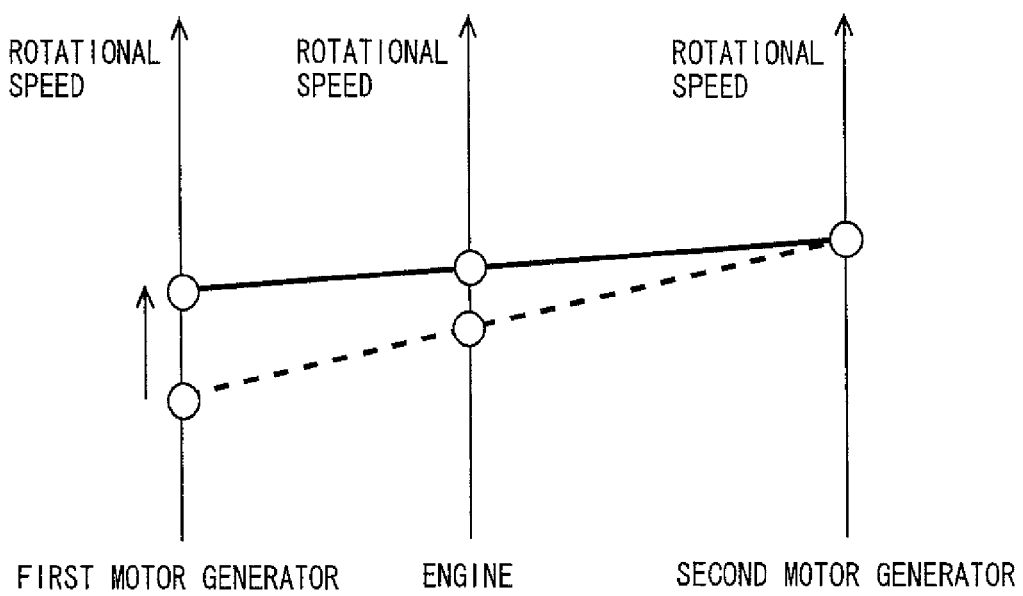
FIG. 4 is a second diagram showing a nomographic chart of the power split device.
Figure 5:
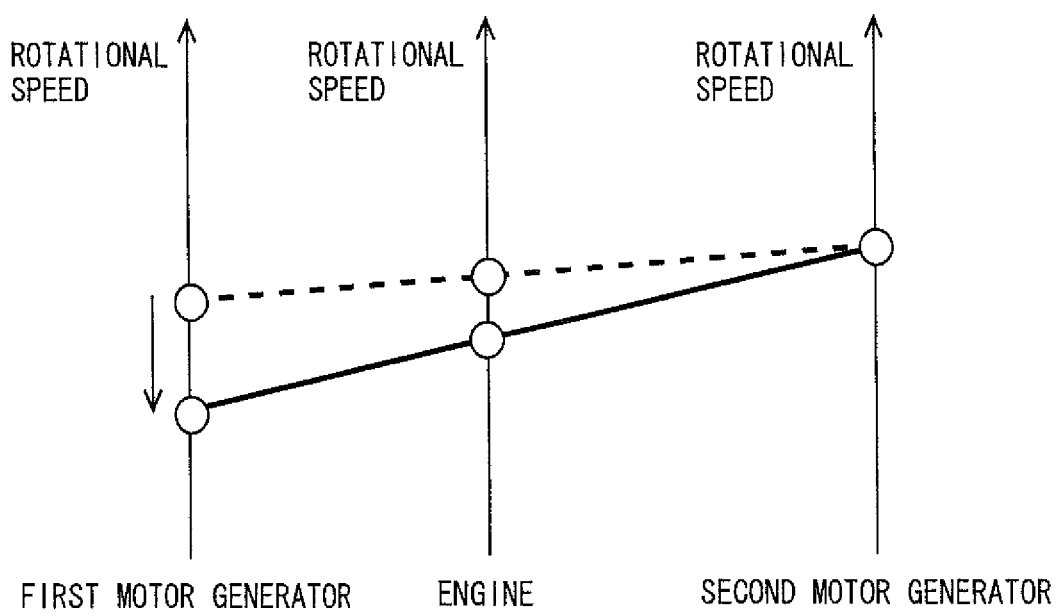
FIG. 5 is a third diagram showing a nomographic chart of the power split device.

Therefore, in the present embodiment, first motor generator 110 can be driven to rotate output shaft 108 of first motor generator 110 with engine 100 being inactive and with the rotational speed of second motor generator 120, i.e., the vehicle speed being maintained. For example, as shown in FIG. 4, when starting engine 100, in order to crank engine 100 while maintaining the rotational speed of second motor generator 120, i.e., the vehicle speed, first motor generator 110 can be driven to increase the rotational speed of first motor generator 110 and engine speed NE. Conversely, as shown in FIG. 5, the rotational speed of first motor generator 110 and engine speed NE can be decreased while maintaining the rotational speed of second motor generator 120, i.e., the vehicle speed.

Turning back to FIG. 1, battery 150 is a battery pack configured such that a plurality of battery modules, each formed by integrating a plurality of battery cells, are connected in series. The voltage of battery 150 is, for example, about 200 V. Battery 150 is charged with electric power supplied from first motor generator 110 and second motor generator 120 as well as a power source external to the vehicle. A capacitor may be used in place of or in addition to battery 150.

Figure 6:
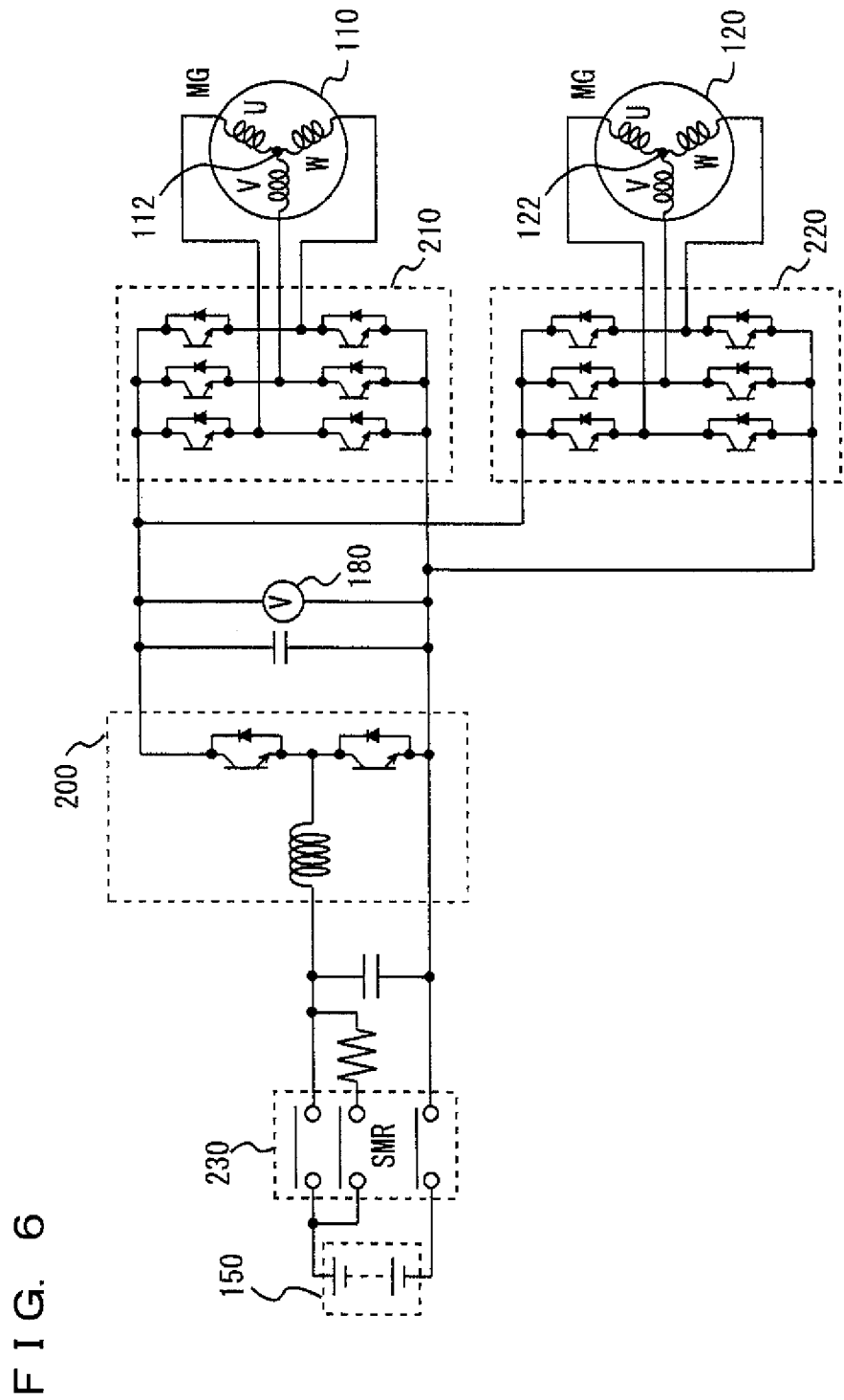
FIG. 6 shows an electrical system of the hybrid vehicle.

Referring to FIG. 6, the electrical system of the hybrid vehicle is further described. Provided in the hybrid vehicle are a converter 200, a first inverter 210, a second inverter 220, and a system main relay 230.

Converter 200 includes a reactor, two npn transistors, and two diodes. The reactor has one end connected to the positive electrode side of each battery and has the other end connected to a node between the two npn transistors.

The two npn transistors are connected in series. The npn transistors are controlled by ECU 170. A diode is connected between the collector and the emitter of each npn transistor to allow current to flow from the emitter side to the collector side.

As the npn transistor, for example, an IGBT (Insulated Gate Bipolar Transistor) can be used. In place of the npn transistor, a power switching element such as a power MOSFET (Metal Oxide Semiconductor Field-Effect Transistor) can be used.

When electric power discharged from battery 150 is supplied to first motor generator 110 or second motor generator 120, the voltage is boosted by converter 200. Conversely, when electric power generated by first motor generator 110 or second motor generator 120 is supplied to charge battery 150, the voltage is decreased by converter 200.

A system voltage VH between converter 200 and each inverter is detected by a voltage sensor 180. The detection result from voltage sensor 180 is sent to ECU 170.

First inverter 210 includes a U-phase arm, a V-phase arm, and a W-phase arm. The U-phase arm, the V-phase arm, and the W-phase arm are connected in parallel. Each of the U-phase arm, the V-phase arm, and the W-phase arm has two npn transistors connected in series. A diode is connected between the collector and the emitter of each npn transistor to allow current to flow from the emitter side to the collector side. Then, the node between the npn transistors in each arm is connected to the end different from a neutral point 112 of each coil of first motor generator 110.

First inverter 210 converts direct current supplied from battery 150 into alternating current, and supplies the alternating current to first motor generator 110. First inverter 210 converts alternating current generated by first motor generator 110 into direct current.

Second inverter 220 includes a U-phase arm, a V-phase arm, and a W-phase arm. The U-phase arm, the V-phase arm, and the W-phase arm are connected in parallel. Each of the U-phase arm, the V-phase arm, and the W-phase arm has two npn transistors connected in series. A diode is connected between the collector and the emitter of each of the npn transistors to allow current to flow from the emitter side to the collector side. Then, the node between the npn transistors in each arm is connected to the end different from neutral point 122 of each coil of second motor generator 120.

Second inverter 220 converts direct current supplied from battery 150 into alternating current and supplies the alternating current to second motor generator 120. Second inverter 220 converts the alternating current generated by second motor generator 120 into direct current.

Converter 200, first inverter 210, and second inverter 220 are controlled by ECU 170.

System main relay 230 is provided between battery 150 and converter 200. System main relay 230 is a relay for switching between a state in which battery 150 and the electrical system are connected to each other and a state in which battery 150 and the electrical system are disconnected from each other. When system main relay 230 is in an open state, battery 150 is disconnected from the electrical system. When system main relay 230 is in a close state, battery 150 is connected to the electrical system.

The state of system main relay 230 is controlled by ECU 170. For example, when ECU 170 is activated, system main relay 230 is closed. When ECU 170 is stopped, system main relay 230 is opened.

Figure 7:
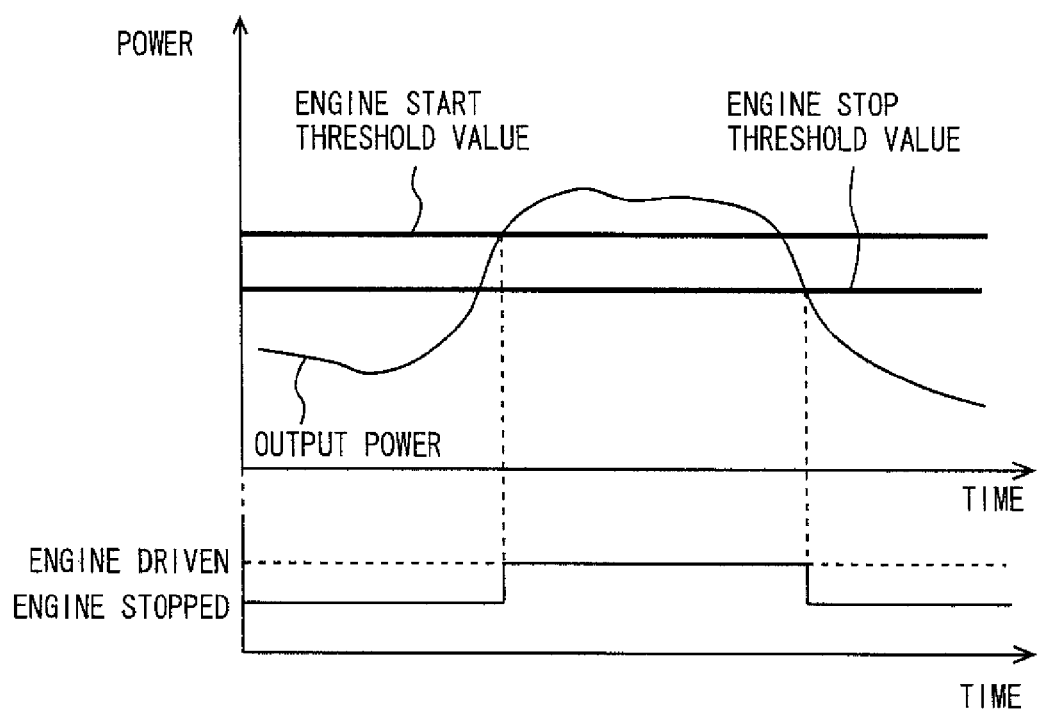
FIG. 7 shows a period during which the engine is driven and a period during which the engine is stopped.

Referring to FIG. 7, the following describes a manner of controlling engine 100. As shown in FIG. 7, when the output power of the hybrid vehicle is smaller than an engine start threshold value, the hybrid vehicle runs using only the driving power of second motor generator 120.

The output power is set as power used for running of the hybrid vehicle. The output power is, for example, determined by ECU 170 in accordance with a map having parameters such as the accelerator position, the vehicle speed, and the like. It should be noted that the method of determining the output power is not limited to this. It should be also noted that the torque, a degree of acceleration, the driving power, the accelerator position, and the like may be employed instead of the output power.

When the output power of the hybrid vehicle reaches or exceeds the engine start threshold value, engine 100 is driven. Accordingly, the hybrid vehicle runs using the driving power of engine 100 in addition to or instead of the driving power of second motor generator 120. Further, the electric power generated by first motor generator 110 using the driving power of engine 100 is directly supplied to second motor generator 120.

Figure 8:
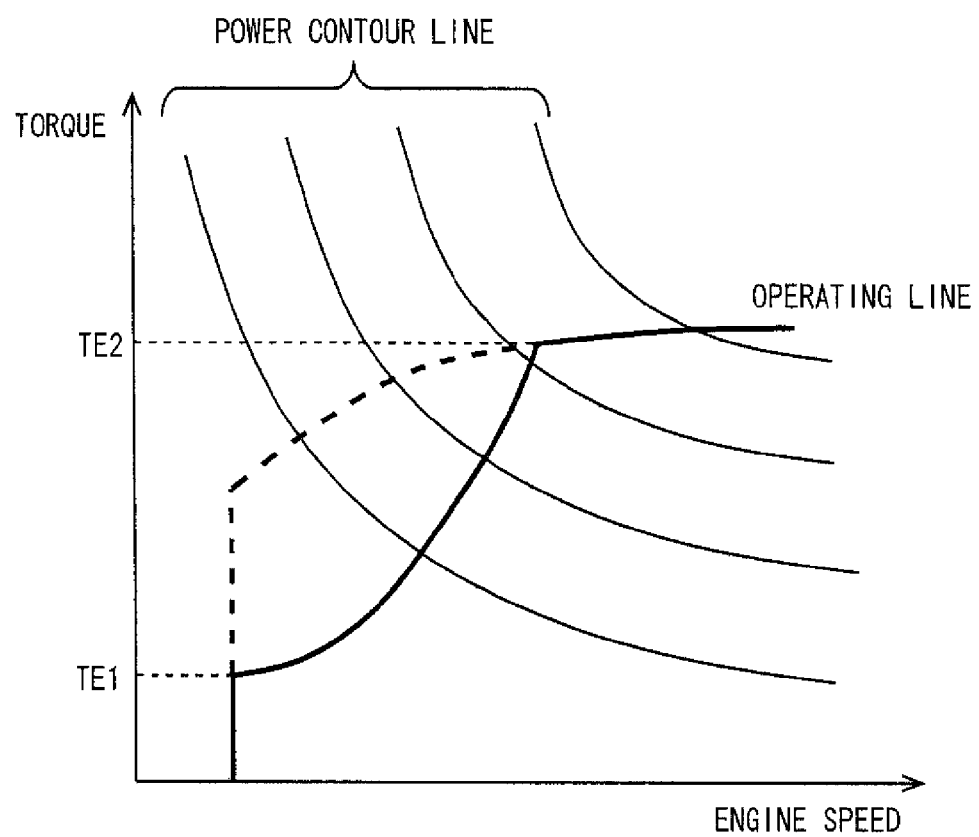
FIG. 8 shows an operating line and a power contour line of the engine.

As shown in FIG. 8, an operating point of engine 100, i.e., engine speed NE and output torque TE, is determined by an intersection between the output power and an operating line.

The output power is indicated by a power contour line. The operating line is determined in advance by a developer based on results of experiment and simulation. The operating line is set to allow engine 100 to be driven with optimum (minimum) fuel consumption. Namely, optimum fuel consumption is achieved by driving engine 100 in accordance with the operating line. It should be noted that the operating line is set to reduce vibration and noise in a range from a predetermined torque TE1 to a predetermined torque TE2. It should be noted that the method of setting the operating line is not limited to these.

Figure 9:
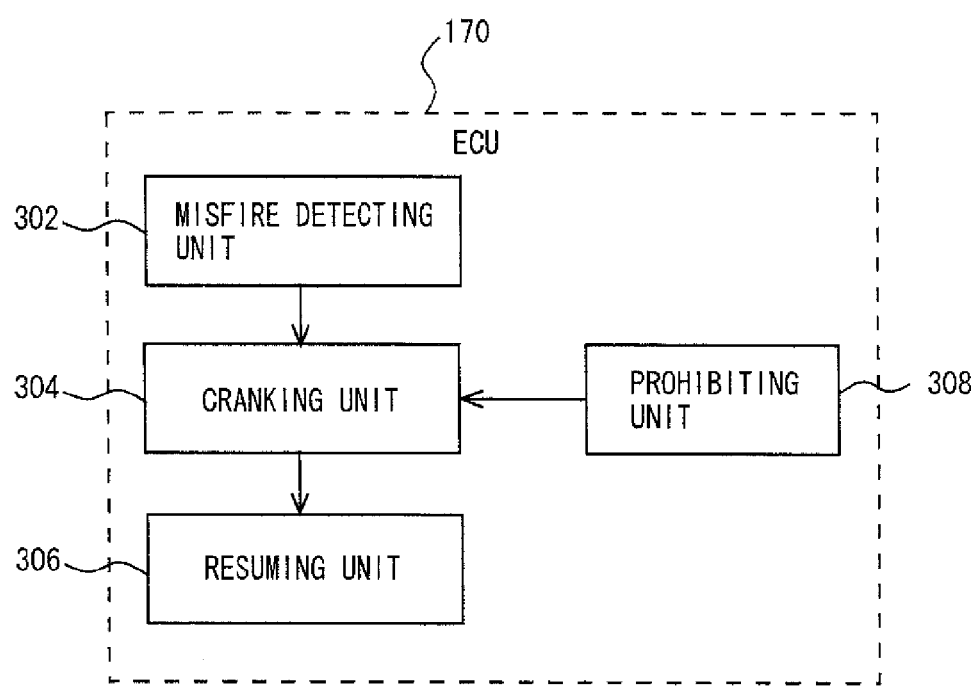
FIG. 9 is a function block diagram of an ECU.

Referring to FIG. 9, the following describes functions of ECU 170 in the present embodiment. It should be noted that the functions described below may be implemented by hardware, software, or cooperation of hardware and software.

ECU 170 includes a misfire detecting unit 302, a cranking unit 304, a resuming unit 306, and a prohibiting unit 308.

Figure 10:
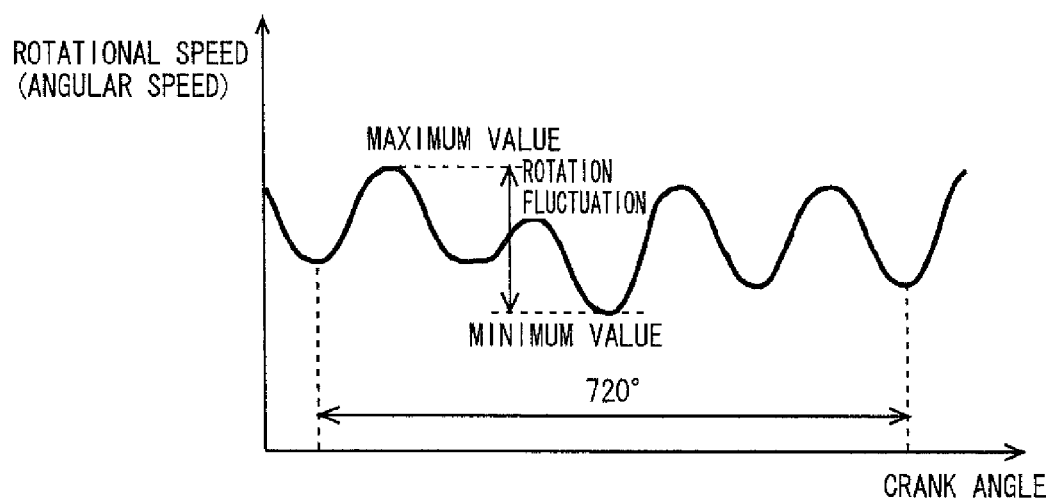
FIG. 10 shows rotational speed of the engine.

Misfire detecting unit 302 detects misfire in engine 100. For example, as shown in FIG. 10, it is determined whether or not rotation fluctuation among the cylinders, i.e., a difference between the maximum value and the minimum value of the rotational speed of the crankshaft in the interval of 720° in crank angle is equal to or greater than a threshold value. When the rotation fluctuation is equal to or greater than the threshold value, misfire in engine 100 is detected. The method of detecting the misfire is not limited to this and various well-known techniques may be utilized.

Turning back to FIG. 9, when the misfire is detected in engine 100, cranking unit 304 suspends ignition and supply of fuel to engine 100 (fuel injection from the injector). While maintaining the suspension of the ignition and the supply of fuel to engine 100, first motor generator 110 is driven to rotate output shaft 108 of engine 100. Namely, engine 100 is cranked.

Figure 11:
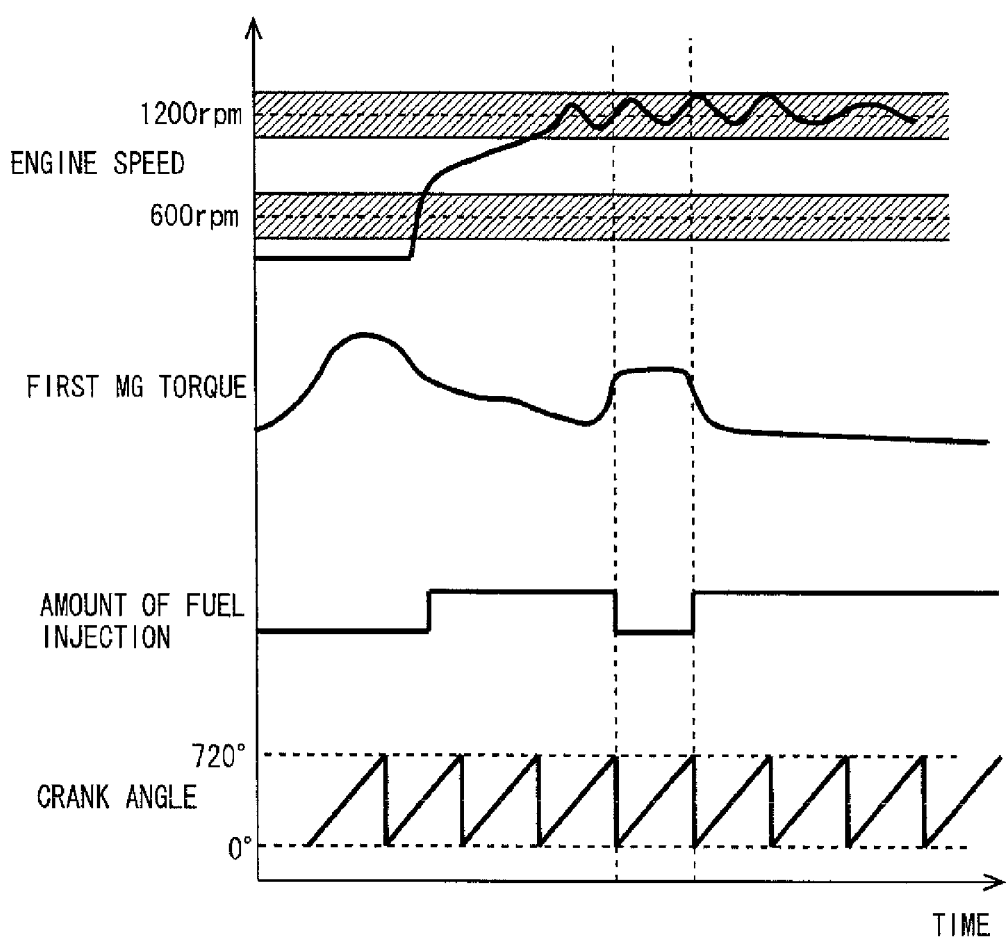
FIG. 11 is a first diagram showing the engine speed, torque of a first motor generator, an amount of fuel injection, and a crank angle.

As shown in FIG. 11, cranking unit 304 rotates output shaft 108 of engine 100 by, for example, a crank angle of 720° or a crank angle of multiple of 720°. In this way, output shaft 108 of engine 100 is rotated until air in all the cylinders is replaced.

The angle by which output shaft 108 of engine 100 is rotated is not limited to these. Output shaft 108 of engine 100 may be rotated by an angle smaller than 720°. When a cylinder in which the misfire has occurred can be specified, output shaft 108 of engine 100 may be rotated until at least air in the cylinder in which the misfire has occurred is replaced. A conventional technique can be used for the method of specifying the cylinder in which the misfire has occurred. Hence, the method of specifying is not repeatedly described in detail here. A reference character "MG" in FIG. 11 represents "motor generator".

In the present embodiment, if misfire in engine 100 is detected when engine speed NE is in a predetermined resonance region, cranking unit 304 suspends ignition and supply of fuel to engine 100, and drives first motor generator 110 to rotate output shaft 108 of engine 100 while maintaining the suspension of the ignition and the supply of fuel to engine 100.

For example, as shown in FIG. 11, each of a region set to include 600 rpm and a region set to include 1200 rpm is set as the resonance region. Thus, if misfire in engine 100 is detected when engine speed NE falls within the region set to include 600 rpm or the region set to include 1200 rpm, the ignition and supply of fuel to engine 100 are suspended, and first motor generator 110 is driven to rotate output shaft 108 of engine 100 while maintaining the suspension of the ignition and the supply of fuel to engine 100. The resonance regions shown in FIG. 11 are set in view of a fact that the vehicle body can be greatly vibrated by misfire in the operation region around 600 rpm or around 1200 rpm. Hence, if misfire occurs, engine speeds NE that can cause rotation fluctuation at a frequency around the resonance frequency of the powertrain may be set as the resonance regions.

While rotating output shaft 108 of engine 100 by driving first motor generator 110 with the ignition and supply of fuel to engine 100 being suspended, ECU 170 drives second motor generator 120. Second motor generator 120 is controlled to achieve the above-described output power set based on the accelerator position or the like. By driving second motor generator 120, the hybrid vehicle runs continuously.

Turning back to FIG. 9, after output shaft 108 of engine 100 is rotated by a desired crank angle with the ignition and the supply of fuel to engine 100 being suspended, resuming unit 306 resumes the ignition and supply of the fuel to engine 100. In other words, fuel injection from the injector and ignition by ignition plug 106 are resumed. Accordingly, engine 100 is restarted.

In the present embodiment, if the rotation fluctuation of output shaft 108 reaches or exceeds the threshold value even after engine 100 is restarted, the series of processes described above are repeated. In other words, with the ignition and supply of fuel to engine 100 being suspended, engine 100 is cranked again by driving first motor generator 110. Thereafter, engine 100 is restarted.

Although relatively large vibration occurs when restarting engine 100, in the present embodiment, engine 100 is cranked and restarted only when it is in each of the operation regions in which the vehicle body is greatly vibrated due to misfire as the described above. Hence, when the vibration resulting from misfire is small, engine 100 is operated continuously. In this way, occurrence of the unnecessarily large vibration is avoided.

When the state of charge of battery 150 is lower than the threshold value, prohibiting unit 308 prohibits driving of first motor generator 110. Thus, if misfire is detected when the state of charge of battery 150 is lower than the threshold value, the ignition and supply of fuel to engine 100 is continued and engine 100 is not cranked. In other words, engine 100 is continuously operated.

Further, when the number of times of suspending the ignition and supply of fuel to the internal combustion engine is larger than a predetermined number of times, prohibiting unit 308 prohibits the suspension of the ignition and supply of fuel to the internal combustion engine. Thus, if misfire is detected again when the number of times of suspending the ignition and supply of fuel to the internal combustion engine in response to detection of misfire is larger than the predetermined number of times, the ignition and supply of fuel to engine 100 are continued and engine 100 is not cranked. In other words, engine 100 is continuously operated.

Figure 12:
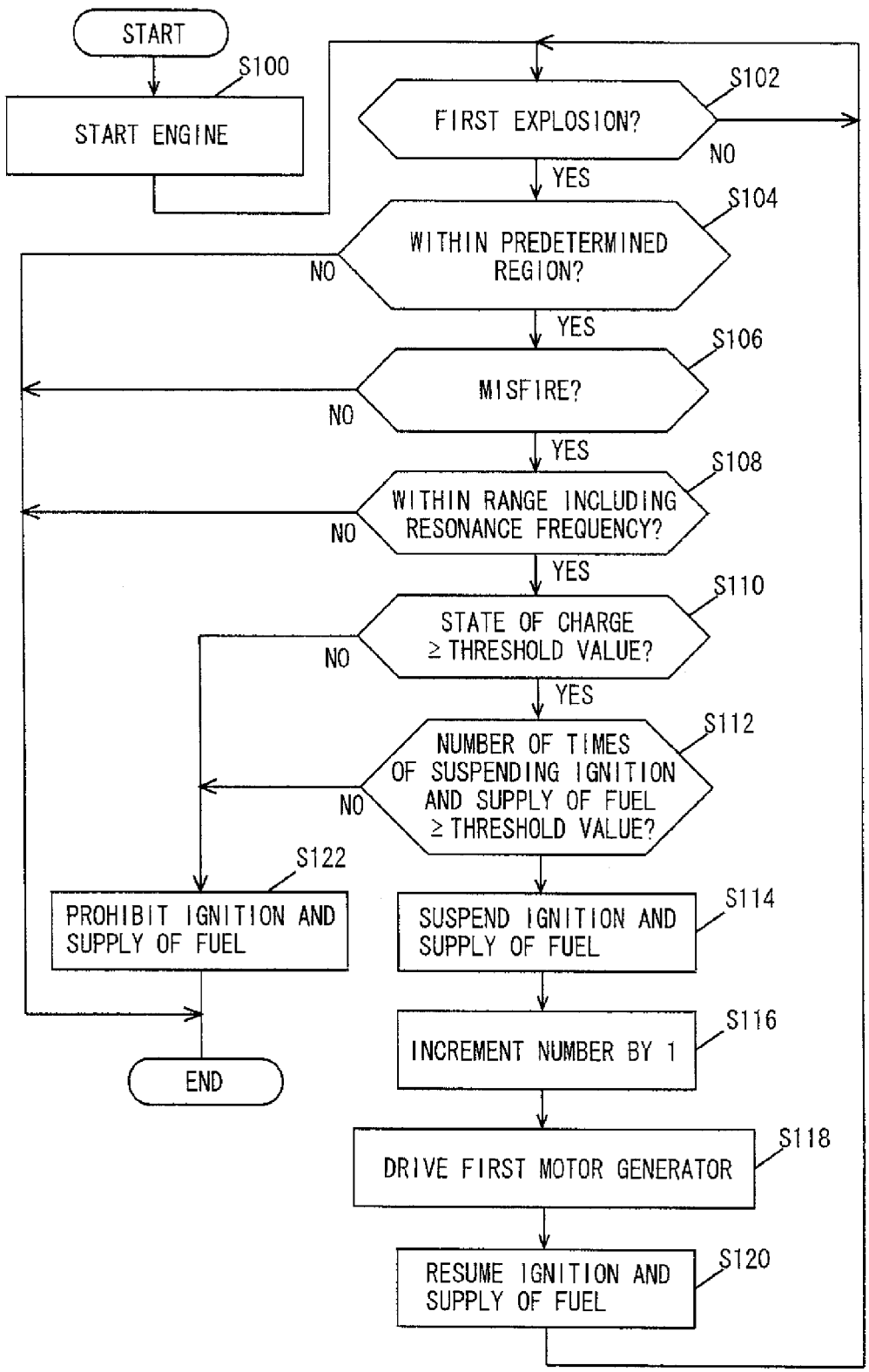
FIG. 12 is a flowchart showing a control structure of processes performed by the ECU.

Referring to FIG. 12, the following describes a control structure of the processes performed by ECU 170.

In a step (hereinafter, the word "step" will be abbreviated as "S") 100, ECU 170 starts engine 100. As described above, when the output power of the hybrid vehicle reaches or exceeds the engine start threshold value, engine 100 is started by cranking engine 100 using first motor generator 110.

Thereafter, in S102, ECU 170 determines whether or not a first explosion has been detected in engine 100. A general well-known technique can be used to detect the first explosion in engine 100, and therefore detailed description thereof is not provided repeatedly here.

When the first explosion is detected (YES in S102), in S104, ECU 170 determines whether or not engine speed NE falls within the predetermined region. As described above, in the present embodiment, for example, it is determined whether or not engine speed NE falls within the region set to include 600 rpm or the region set to include 1200 rpm.

When engine speed NE is in the predetermined region (YES in S104), in S106, ECU 170 determines whether or not misfire has been detected. In other words, it is determined whether or not rotation fluctuation among the cylinders is equal to or greater than the threshold value.

When the misfire is detected (YES in S106), in S108, ECU 170 determines whether or not the frequency of the rotation fluctuation of output shaft 108 of engine 100 falls within the range of frequencies set to include the resonance frequency of the powertrain. For example, when the resonance frequency of the powertrain is 10 Hz, it is determined whether or not the frequency of the rotation fluctuation of output shaft 108 of engine 100 falls within a range of frequencies set to include 10 Hz. The frequency of the rotation fluctuation is determined based on, for example, the rotational speed of output shaft 108 of engine 100.

When the frequency of the rotation fluctuation of output shaft 108 of engine 100 falls within the range of frequencies set to include the resonance frequency of the powertrain (YES in S108), in S110, ECU 170 determines whether or not the state of charge of battery 150 is equal to or greater than the threshold value.

When the state of charge of battery 150 is equal to or greater than the threshold value (YES in S110), in S112, ECU 170 determines whether or not the number of times of suspending the ignition and supply of fuel to engine 100 is equal to or smaller than the threshold value.

When the number of times of suspending the ignition and supply of fuel to engine 100 is smaller than the threshold value (YES in S112), in S114, ECU 170 suspends the ignition and supply of fuel to engine 100. In S116, ECU 170 increments, by 1, the number of times of suspending the ignition and supply of fuel to engine 100.

In S118, ECU 170 drives first motor generator 110 to rotate output shaft 108 of engine 100. In other words, engine 100 is cranked. As described above, engine 100 is cranked by a crank angle of 720° or a crank angle of multiple of 720°.

Thereafter, in S120, ECU 170 resumes the ignition and supply of fuel to engine 100. In other words, fuel injection from the injector and ignition by ignition plug 106 are resumed. Accordingly, engine 100 is restarted.

When the state of charge of battery 150 is lower than the threshold value (NO in S110) or when the number of times of suspending the ignition and supply of fuel to engine 100 is larger than the threshold value (NO in S112), in S122, ECU 170 prohibits the ignition and supply of fuel to the internal combustion engine. Accordingly, engine 100 is continuously operated.

As described above, according to the present embodiment, if misfire is detected, the ignition and supply of fuel to engine 100 are suspended. In other words, the combustion of the air-fuel mixture is suspended in all the cylinders. Accordingly, the fluctuation of the rotational speed of output shaft 108 of engine 100 is made small. Hence, vibration resulting from the misfire is reduced quickly. In this state, output shaft 108 of engine 100 is rotated using first motor generator 110. Accordingly, air having caused the misfire is exhausted from the cylinders and new air is supplied to fill the cylinders. Hence, when resuming the ignition and supply of fuel, misfire can be less likely to occur. In this way, misfire is suppressed.

Other Embodiment

Figure 13:
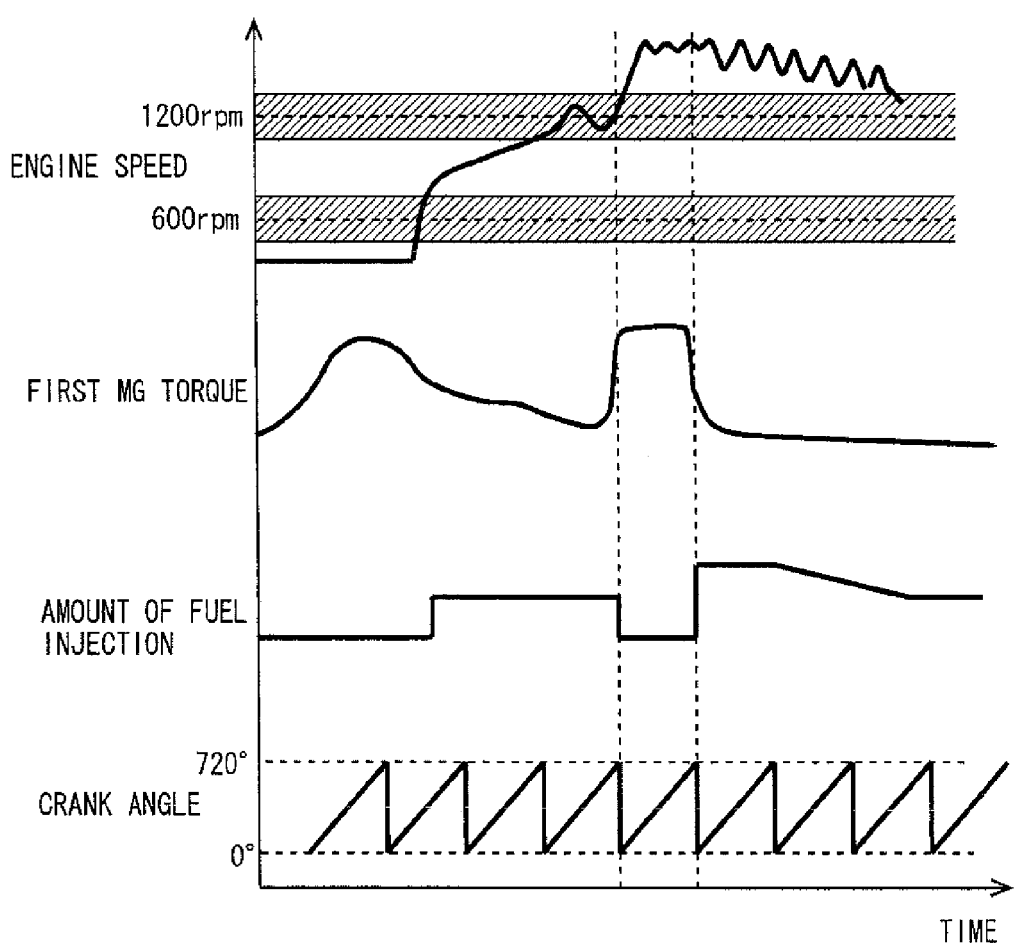
FIG. 13 is a second diagram showing the engine speed, the torque of the first motor generator, the amount of fuel injection, and the crank angle.

As shown in FIG. 13, if misfire is detected in engine 100 when the rotational speed of the output shaft of engine 100 falls within each of the above-described resonance regions, output shaft 108 of engine 100 may be rotated at a rotational speed falling out of the resonance regions by suspending the ignition and supply of fuel to engine 100 and driving the first motor generator while maintaining the suspension of the ignition and supply of fuel to engine 100. In this way, vibration that can be caused by the misfire can be further reduced.

Figure 14:
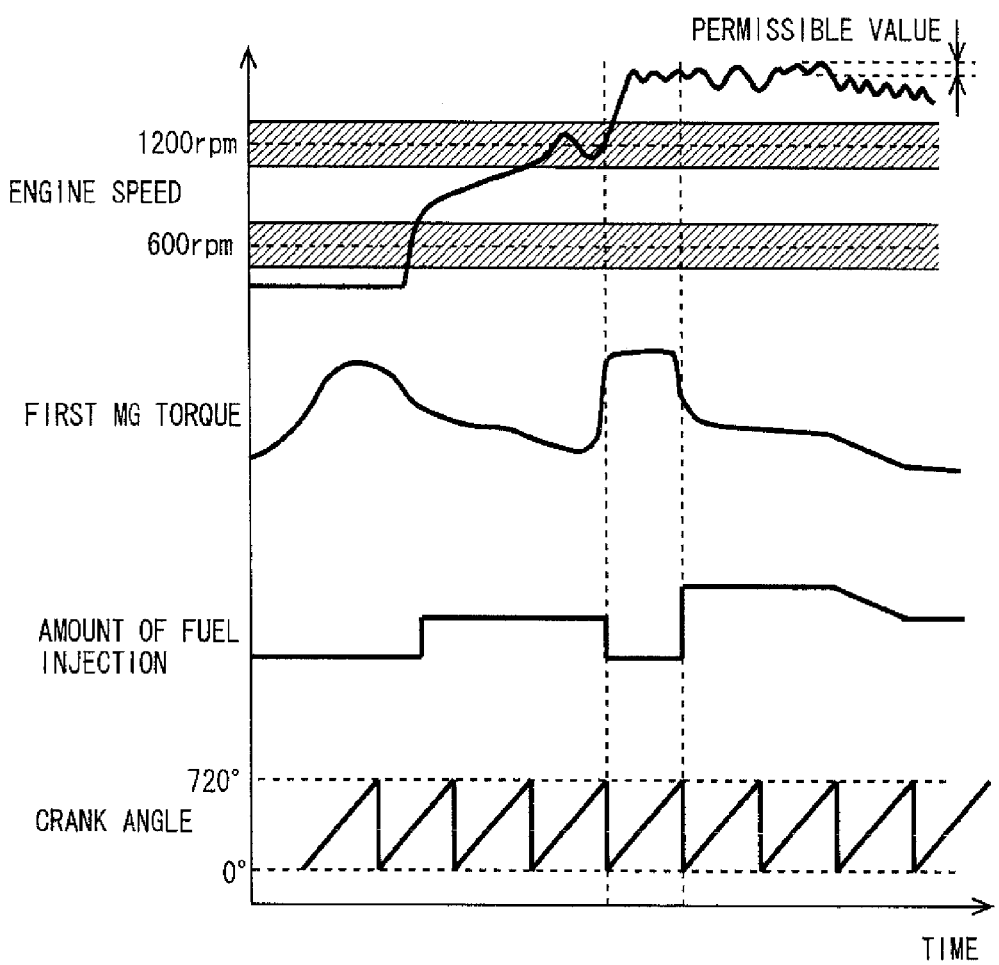
FIG. 14 is a third diagram showing the engine speed, the torque of the first motor generator, the amount of fuel injection, and the crank angle.

In this case, as shown in FIG. 14, when the rotation fluctuation of output shaft 108 of engine 100 reaches or falls below a predetermined permissible value after resuming the ignition and supply of fuel to engine 100, i.e., after restarting engine 100, engine speed NE may be set back to a desired rotational speed. In this way, vibration that can be caused by resonance of the powertrain can be further reduced.

The embodiments disclosed herein are illustrative and non-restrictive in any respect. The scope of the present invention is defined by the terms of the claims, rather than the embodiments described above, and is intended to include any modifications within the scope and meaning equivalent to the tents of the claims.

REFERENCE SIGNS LIST

100: engine; 101: first cylinder; 102: second cylinder; 103: third cylinder; 104: fourth cylinder; 105: piston; 106: ignition plug; 108: output shaft; 110: first motor generator; 120: second motor generator; 130: power split device; 140: speed reducer; 150: battery; 160: front wheel; 170: ECU; 172: accelerator pedal; 174: rotational speed sensor; 200: converter; 210: first inverter; 220: second inverter; 230: system main relay; 302: misfire detecting unit; 304: cranking unit; 306: resuming unit; 308: prohibiting unit.

The invention claimed is:

1. A powertrain comprising:
an internal combustion engine provided with a plurality of cylinders;
an electric motor coupled to an output shaft of said internal combustion engine; and
a control unit that suspends ignition and supply of fuel to said internal combustion engine when misfire in said internal combustion engine is detected while a rotational speed of the output shaft of said internal combustion engine falls within a predetermined region, and rotates the output shaft of said internal combustion engine at a rotational speed falling out of said predetermined region by driving said electric motor until at least air in a cylinder in which the misfire has occurred is replaced, while maintaining the suspension of the ignition and supply of fuel to said internal combustion engine.

2. The powertrain according to claim 1, wherein said control unit resumes the ignition and supply of fuel to said internal combustion engine after rotating the output shaft of said internal combustion engine while maintaining the suspension of the ignition and supply of fuel to said internal combustion engine.

3. The powertrain according to claim 1, wherein said control unit rotates the output shaft of said internal combustion engine until air in all the cylinders is replaced.

4. The powertrain according to claim 1, further comprising a power storage device that stores electric power to be supplied to said electric motor, wherein
said control unit prohibits driving of said electric motor when a state of charge of said power storage device is lower than a threshold value.

5. The powertrain according to claim 1, wherein said control unit prohibits the suspension of the ignition and supply of fuel to said internal combustion engine when the number of times of suspending the ignition and supply of fuel to said internal combustion engine is greater than a predetermined number of times.

6. The powertrain according to claim 1, further comprising another electric motor coupled to a wheel and different from said electric motor, wherein
when the misfire in said internal combustion engine is detected, said control unit drives said another electric motor while maintaining the suspension of the ignition and supply of fuel to said internal combustion engine.

7. A method for controlling an internal combustion engine provided with a plurality of cylinders, comprising the steps of:
detecting misfire in said internal combustion engine;
suspending ignition and supply of fuel to said internal combustion engine when the misfire in said internal combustion engine is detected while a rotational speed of an output shaft of said internal combustion engine falls within a predetermined region, and
rotating the output shaft of said internal combustion engine at a rotational speed falling out of said predetermined region by driving an electric motor coupled to the output shaft of said internal combustion engine until at least air in a cylinder in which the misfire has occurred is replaced, while maintaining the suspension of the ignition and supply of fuel to said internal combustion engine.

8. A device for controlling an internal combustion engine provided with a plurality of cylinders, comprising:
means for detecting misfire in said internal combustion engine; and
means for suspending ignition and supply of fuel to said internal combustion engine when the misfire in said internal combustion engine is detected while a rotational speed of an output shaft of said internal combustion engine falls within a predetermine region, and rotating the output shaft of said internal combustion engine at a rotational speed falling out of said predetermined region by driving an electric motor coupled to the output shaft of said internal combustion engine until at least air in a cylinder in which the misfire has occurred is replaced, while maintaining the suspension of the ignition and supply of fuel to said internal combustion engine.

* * * * *